United States Patent [19]
Dziki

[11] Patent Number: 4,774,123
[45] Date of Patent: Sep. 27, 1988

[54] THERMOPLASTIC BLOCK SHAPE AND MANUFACTURING METHOD

[75] Inventor: Michael M. Dziki, Woodbury, Minn.

[73] Assignee: Minnesota Mining and Manufacturing Company, Saint Paul, Minn.

[21] Appl. No.: 892,243

[22] Filed: Jul. 31, 1986

Related U.S. Application Data

[63] Continuation-in-part of Ser. No. 664,044, Oct. 23, 1984, Pat. No. 4,621,748.

[51] Int. Cl.$^4$ ............................................. D02G 3/00
[52] U.S. Cl. ................................... 428/156; 428/167; 428/364; 428/397; 428/400
[58] Field of Search ................... 222/146.1, 146.5; 206/384, 813, 820; 428/51, 52, 156, 167, 364, 369, 371, 397, 398, 399, 400

[56] References Cited

U.S. PATENT DOCUMENTS

| | | | |
|---|---|---|---|
| 2,732,101 | 2/1953 | Sohn | 222/320 |
| 2,760,228 | 8/1956 | Verges | 156/433 |
| 2,874,084 | 2/1959 | Paulsen | 428/397 |
| 2,995,159 | 8/1961 | Berggren | 141/82 |
| 3,204,828 | 9/1965 | Paulsen | 222/146.5 |
| 3,298,572 | 1/1967 | Newton | 222/146.5 |
| 3,337,093 | 8/1967 | Newton | 222/146.5 |
| 3,377,012 | 4/1968 | Cushman | 228/40 |
| 3,612,357 | 10/1971 | Ruskin | 222/146.5 |
| 3,732,046 | 5/1973 | Martin | 425/140 |
| 3,917,123 | 11/1975 | Grenfell | 222/146.5 |
| 4,072,778 | 2/1978 | Lamb | 428/52 |
| 4,186,239 | 1/1980 | Mize et al. | 428/399 |
| 4,229,501 | 10/1980 | Kern | 428/399 |
| 4,315,885 | 2/1982 | Lemelson | 264/297 |
| 4,360,104 | 11/1982 | Lang | 206/820 |

Primary Examiner—William J. Van Balen
Attorney, Agent, or Firm—Donald M. Sell; William L. Huebsch

[57] ABSTRACT

An elongate piece of solid thermoplastic material having coaxial generally cylindrical portions with uniform predetermined axial and diametrical dimensions uniformly axially spaced along the piece by generally rectangular portions having diagonal dimensions about equal to the diametrical dimension of the cylindrical portions, and a device for continuously molding a continuous length of solid thermoplastic material between molds moved face to face along a linear path from which such elongate pieces can be cut.

16 Claims, 6 Drawing Sheets

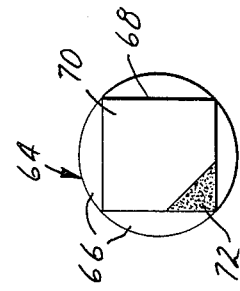
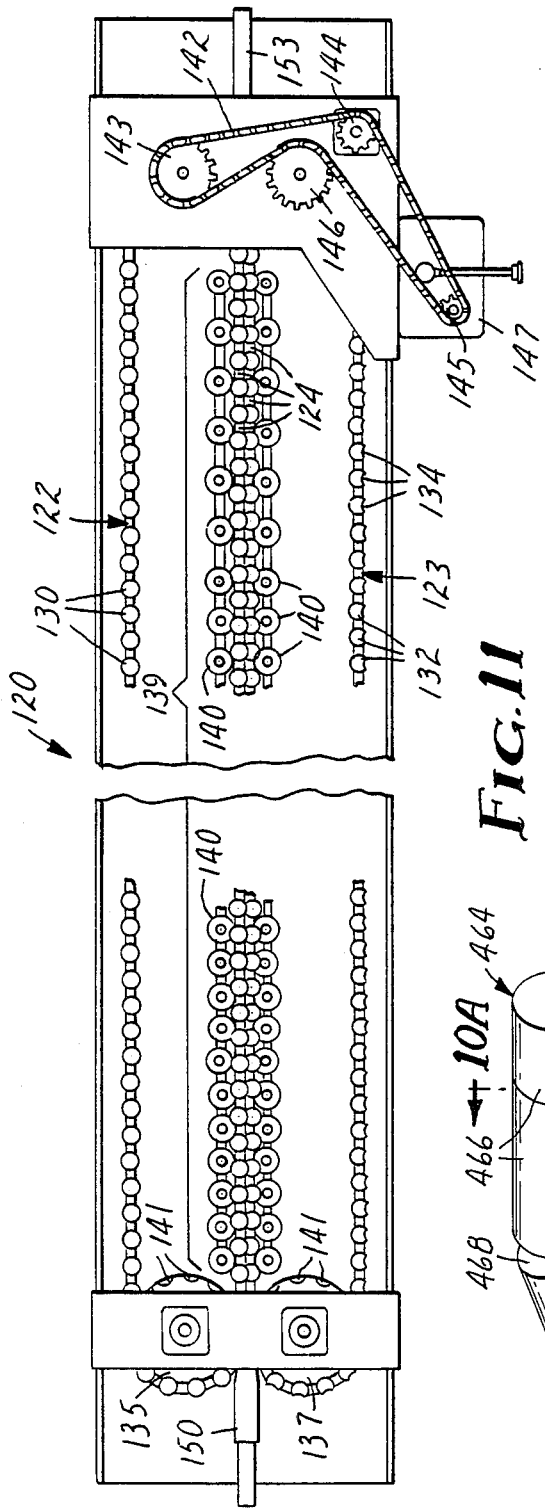
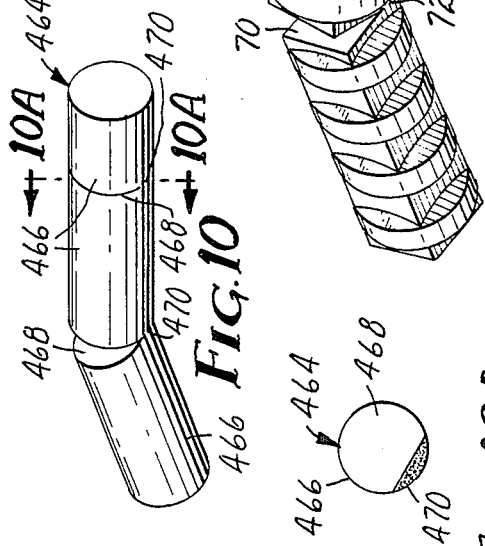

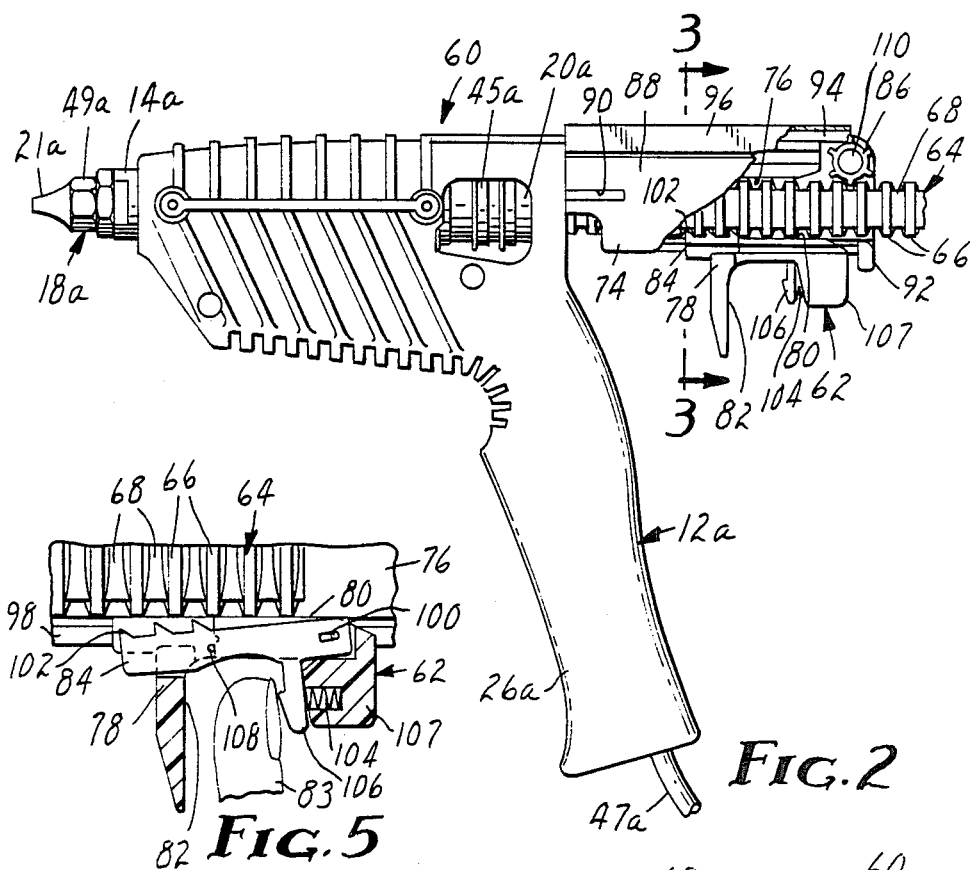
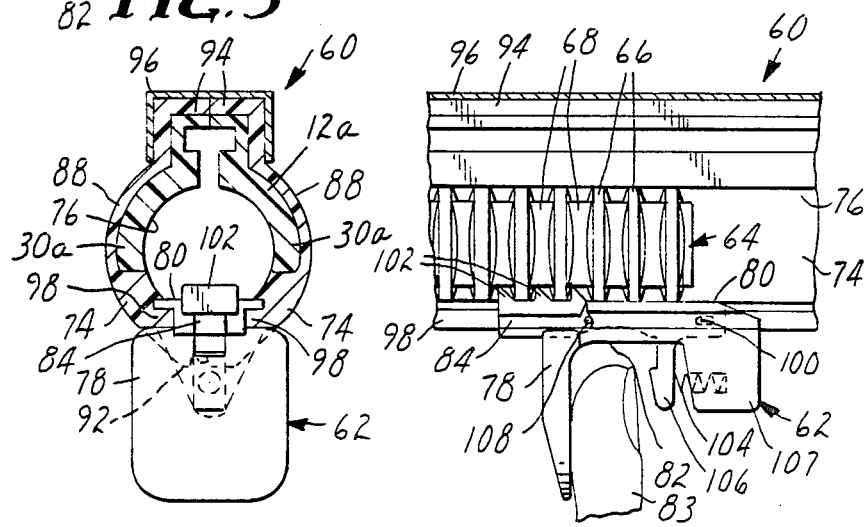

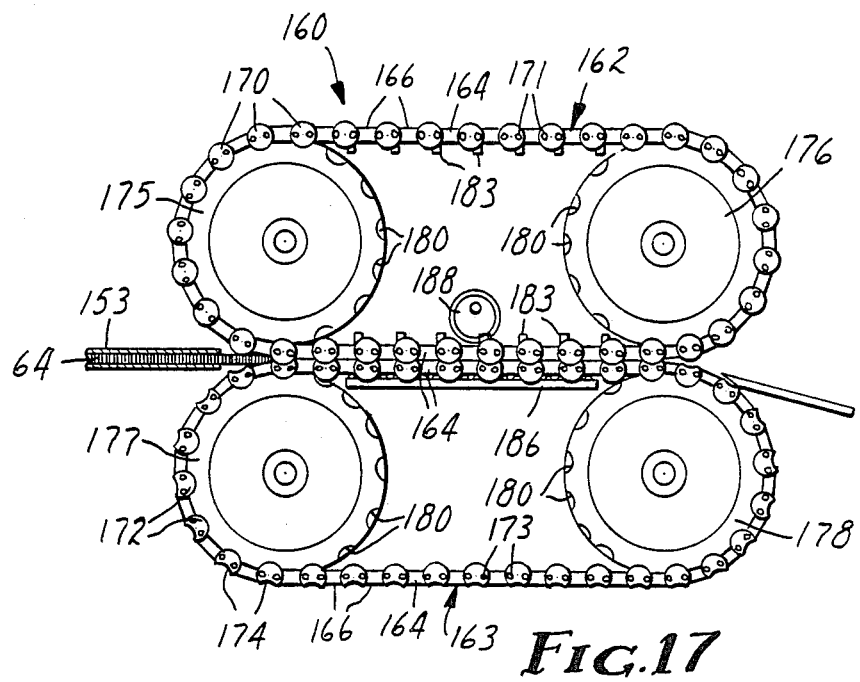
FIG. 17
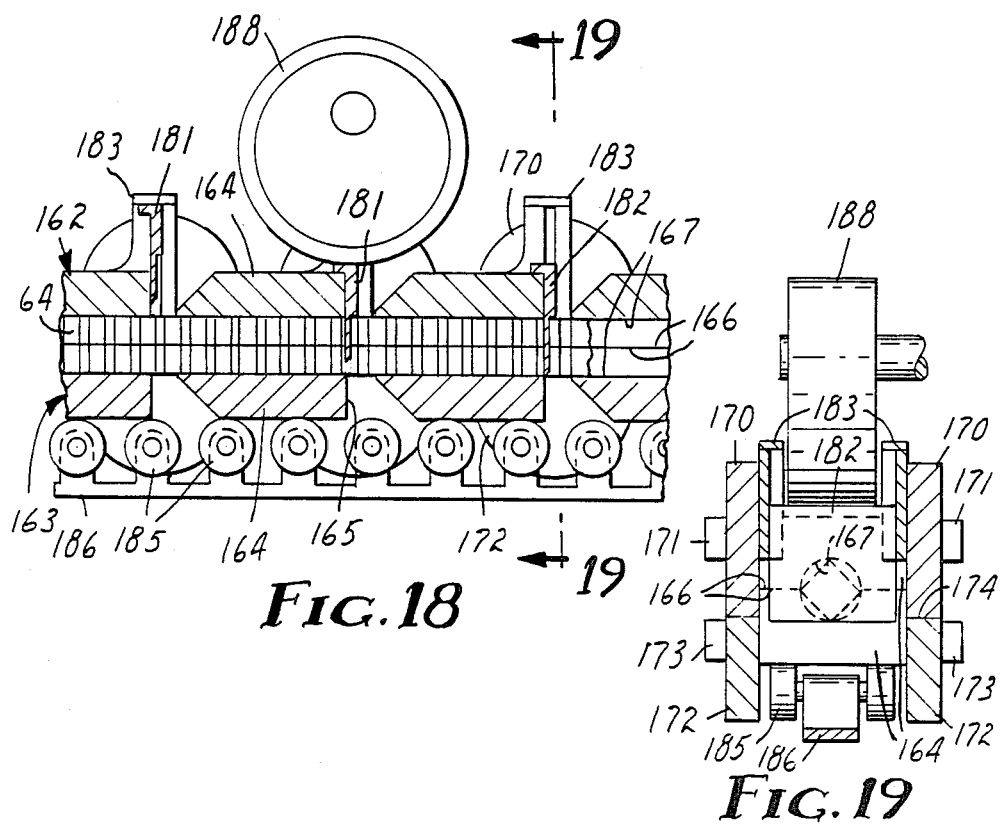
FIG. 18
FIG. 19

THERMOPLASTIC BLOCK SHAPE AND MANUFACTURING METHOD

CROSS REFERENCE TO RELATED APPLICATION

This application is a continuation-in-part of U.S. patent application Ser. No. 664,044 filed Oct. 23, 1984 now U.S. Pat. No. 4,621,748.

TECHNICAL FIELD

This application relates to shapes for blocks or elongate pieces of solid thermoplastic material to be fed through devices that melt the pieces, and methods for making the elongate pieces of thermoplastic material.

BACKGROUND OF THE INVENTION

Various shaped blocks or elongate pieces of solid thermoplastic material are adapted to be fed into devices adapted to receive, melt and dispense molten thermoplastic material from the elongate pieces. Generally such devices comprise a barrel member having an internal melting chamber which communicates with an outlet opening through a nozzle, and a sleeve with a through opening having one end secured to the barrel member with its through opening communicating with the end of the melting chamber opposite the nozzle. The elongate piece of solid thermoplastic material is adapted to fit closely within the through opening in the sleeve, with one end portion of the elongate piece in the melting chamber and the other end portion projecting through the sleeve. Means are provided for heating the barrel member to melt the end portion of the elongate piece of thermoplastic material therein, and the device affords pressing the elongate piece through the sleeve and into the melting chamber to force molten thermoplastic material out of the melting chamber through the nozzle, which with some devices is done with the thumb of a user's hand, and in other devices is done through an automated or manually actuated feed means included in the device.

DISCLOSURE OF THE INVENTION

The present invention provides new shapes for elongate pieces of solid thermoplastic material that can more easily be fed into, melted in or dispensed through a dispensing devices of the type described above than separate cylindrical pieces of thermoplastic material and which can be conveniently provided in very long lengths to minimize loading time; and simple and efficient manufacturing devices and methods for manufacturing the new elongate pieces of thermoplastic material.

According to the present invention there is provided an elongate piece of solid thermoplastic material comprising coaxial generally cylindrical portions of uniform predetermined axial and diametrical dimensions uniformly axially spaced along the elongate piece by portions having rectangular cross sections and diagonal dimensions about equal to the diametrical dimension of the cylindrical portions.

In one preferred embodiment the rectangular portions are square in cross section, and have lengths axially along the elongate piece that are shorter than but generally similar to the axial lengths of the cylindrical portions.

Elongate pieces of solid adhesive thermoplastic material of this shape are quite flexible compared to solid cylindrical blocks so that with the more flexible adhesives they can be coiled for storage (e.g., in 50 centimeter diameter coils). Also, less force is required to feed elongate pieces of solid thermoplastic material of this new shape into a dispensing device than is required to feed cylindrical blocks of thermoplastic into the device for the same output of melted thermoplastic material; apparently because cavities around the periphery of the elongate piece between its cylindrical portions provide receptacles for melted thermoplastic material and allow the solid thermoplastic material to be pressed more directly into contact with the heated barrel member. Additionally such elongate pieces may have spaced cuts extending almost entirely through the elongate pieces while retaining hinge like portions between parts of the elongate pieces that afford ease of bending of elongate pieces of even the larger diameter and stiffer adhesives so that they also may be easily coiled for shipment and storage prior to use.

Another less preferred embodiment of elongate pieces of solid thermoplastic material usable in the dispenser described above comprises uniformly spaced arcuate teeth on only two opposite sides by which the elongate piece may be guided and driven by the dispenser. Such elongate pieces may also have spaced cuts extending almost entirely through the elongate pieces while retaining hinge like portions between parts of the elongate pieces that afford ease of bending of the elongate pieces to coil them for shipment and storage.

In yet another embodiment comprising coaxial generally cylindrical portions of uniform predetermined axial and diametrical dimensions uniformly axially spaced along the elongate piece by portions having rectangular cross sections and diagonal dimensions about equal to the diametrical dimension of the cylindrical portions, the cylindrical portions have an axial length that is much longer than the lengths of the rectangular portions along the elongate piece, and the rectangular portions are elongate in cross section and provide central transverse hinge like portions of sufficient axial length to afford both ease of bending of the elongate piece, and access to an end of the adjacent cylindrical portions to afford driving engagement therewith.

Elongate pieces of solid thermoplastic material of many of the new shapes may be easily formed using mechanisms including a molding mechanism comprising two structures each comprising a plurality of mold parts which when face to face define a cavity having the shape of the elongate piece therebetween, means for moving the mold parts in each of the structures around a separate path with some mold parts along the structures moving in face to face contact along a linear path portion, and means for injecting molten thermoplastic material into a beginning of the cavity defined between the mold parts along the linear path portion and for stripping from the mold parts a continuous length of thermoplastic material formed along the linear path portion. A cutting mechanism forms the spaced transverse cuts and cuts the continuous length of thermoplastic material into elongate pieces of predetermined lengths after it emerges from the molding mechanism.

BRIEF DESCRIPTION OF THE DRAWING

The present invention will be further described with reference to the accompanying drawing wherein like reference numerals refer to like parts in the several views, and wherein:

FIG. 1 is a perspective view of a first embodiment of an elongate piece of solid thermoplastic material having a shape according to the present invention;

FIG. 1A is a sectional view taken approximately along line 1A—1A of FIG. 1;

FIG. 2 is a side view of a dispensing device which includes a manually operable feeding mechanism for feeding elongate pieces of solid thermoplastic material of the type shown in FIG. 1;

FIG. 3 is an enlarged sectional view taken approximately along line 3—3 of FIG. 2;

FIG. 4 is an enlarged fragmentary view of a slide and drive means in the dispensing devices of FIG. 2 being used to press a elongate piece of solid thermoplastic material into the device;

FIG. 5 is an enlarged fragmentary view of the slide and drive means shown in FIG. 4 being retracted along a elongate piece of solid thermoplastic material in the device;

FIG. 10 is a perspective view of yet a fifth embodiment of an elongate piece of solid thermoplastic material having a shape according to the present invention;

FIG. 10A is a sectional view taken approximately along line 10A—10A of FIG. 10;

FIG. 11 is a fragmentary plan view of a continuous molding mechanism according to the present invention for making continuous lengths of thermoplastic material;

FIG. 17 is a plan view of a cutting mechanism according to the present invention for cutting a continuous length of thermoplastic material made by the mechanism shown in FIGS. 11 through 16 into elongate pieces;

FIG. 18 is an enlarged fragmentary sectional view of the mechanism shown in FIG. 17; and FIG. 19 is a fragmentary sectional view taken approximately along line 19—19 of FIG. 18.

DESCRIPTION OF THE PREFERRED EMBODIMENT

Figure 6:
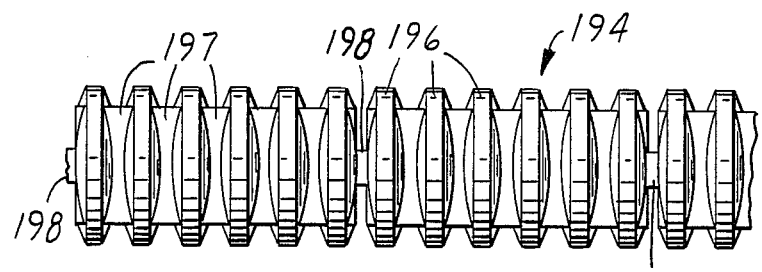
FIG. 6 is a side elevational view of a second embodiment of an elongate piece of solid thermoplastic material having a shape according to the present invention.

Referring now to FIG. 1 there is shown a first embodiment of a block or elongate piece of solid thermoplastic material according to the present invention generally designated by the reference numeral 64.

The piece 64 of solid thermoplastic material comprises a plurality of coaxial generally cylindrical portions 66 with uniform predetermined axial and diametrical dimensions (e.g., about 0.38 centimeter and 1.5 centimeter respectively), which generally cylindrical portions 66 are uniformly axially spaced along the piece 64 by similarly sized and oriented portions 68 having rectangular cross sections (square as illustrated) having uniform diagonal dimensions about equal to the diametrical dimensions of the cylindrical portions 66, having corners aligned with the peripheries of the cylindrical portion 66 and having axial dimensions that are shorter than but generally similar to the axial dimensions of the cylindrical portion 66 (e.g., about 0.25 centimeter). These alternating cylindrical and rectangular portions 66 and 68 result in an elongate piece 64 with evenly spaced projecting arcuate parts of the cylindrical portions 66 projecting from each of four sides of the elongate piece 64 defined by the aligned peripheral surfaces of the rectangular portions 68. These projecting arcuate parts provide uniformly spaced opposed arcuate teeth along opposite sides of the elongate piece 64 with planar surface portions of the elongate piece 64 parallel to the axis of the piece 64 between roots of adjacent teeth, and these teeth or projecting parts of the cylindrical portion 66 are like teeth on a rack and allow the elongate piece 64 to be aligned and driven by a feeding assembly 62 in a dispensing device 60, as will be further explained below with reference to FIGS. 2 through 5. The spaces between these projecting parts of the cylindrical portions 66 also provide receptacles for molten material to facilitate melting the elongate piece 64 within the device 60 as has previously been described. Also, the elongate piece 64 has spaced cuts 70 extending almost entirely transversely through its rectangular portions 68 while retaining generally triangular hinge like portions 72 at corners of those rectangular portions 68 that afford ease of bending of the elongate piece in one direction so that it may be easily coiled for shipment or storage, and allow the elongate piece to be driven like a solid member when its parts are axially aligned.

Referring now to FIGS. 2 through 5 of the drawing there is shown a dispensing device 60 for molten thermoplastic material which has the same structures as a device 10 described in my U.S. Pat. No. 4,552,287, issued Nov. 12, 1985 and incorporated herein by reference, except that a channel 29 and a pressure plate 32 of that device 10 have been replaced by a manually operated feeding assembly 62, which assembly 62 is adapted to feed the elongate piece 64 of solid thermoplastic material shown in FIG. 1. Parts of the device 60 that have the same structures as parts of the device 10 described in U.S. Pat. No. 4,552,287 have been given the same reference numerals to which have been added the suffix "a".

Like the dispensing device 10 described in U.S. Pat. No. 4,552,287, the device 60 comprises a two part frame 12a, a barrel member 14a mounted between the parts of the frame 12a and having an internal melting chamber communicating via a discharge passageway through a valve assembly 18a with an outlet opening through a nozzle 21a, and a sleeve 20a with a cylindrical through opening having one end secured to the barrel member 14a with its through opening communicating with the end of the melting chamber opposite the discharge passageway. The sleeve 20a is adapted to receive the elongate piece 64 of solid thermoplastic material within the cylindrical through opening with a slight clearance fit even when the diameter of the elongate piece 64 is at the large end of its tolerance range, with one end portion of the elongate piece 64 in the melting chamber and the elongate piece 64 projecting through the opening in the sleeve 20a. Means are provided in the device 60 for heating the barrel member to melt the end portion of the elongate piece 64 therein. The frame 12a includes a handle 26a positioned so that an operator can grip the handle 26a with the fingers of one hand while applying pressure with the thumb of that hand to press the elongate piece 64 through the sleeve 20a and into the melting chamber to force molten thermoplastic material out of the melting chamber through the valve assembly 18a and nozzle 21a.

Unlike the device 10 described in U.S. Pat. No. 4,552,287, the device 60 includes the feeding assembly 62 at the end of the sleeve 20a opposite the barrel member 14a, which feeding assembly 62 includes means adapted for receiving and for holding the elongate piece 64 of solid thermoplastic material in the sleeve 20a, while affording the application of force by the thumb of an operator on the elongate piece 64 to press in into the sleeve 20a toward the melting chamber.

As illustrated, the feeding assembly 62 comprises (1) wall means or walls 74 removably fixed to the frame 12a, that define a passageway 76 adapted to guide the elongate piece 64 of solid thermoplastic material in alignment with the through opening in the sleeve 20a; (2) a slide 78 having a cylindrically concave upper surface 80 adapted to support the elongate piece 64, having projecting parts defining a recess 82 opening through its side opposite its upper surface 80 adapted to receive the end portion of an operator's thumb 83, and being mounted on the walls 74 for movement along a path generally aligned with the melting chamber from a retracted position spaced from the sleeve 20a to an advanced position more closely adjacent the sleeve 20a and back to its retracted position, the recess 82 being accessible by the thumb 83 of an operator gripping the handle 26a to afford manual reciprocation of the slide 78 between its retracted and advanced positions by the operator; (3) drive means comprising a drive member 84 pivotably mounted on the slide 78 adapted for engaging the cylindrical portions 66 of the elongate piece 64 of thermoplastic material and advancing the elongate piece 64 toward the melting chamber during movement of the slide 78 from its retracted to its advanced position, and for moving around the cylindrical portions 66 and along the elongate piece 64 of thermoplastic during movement of the slide 78 from its advanced to its retracted position; and (4) means comprising a sprocket wheel 86 rotatably mounted on the walls 74 for aligning the elongate piece 64 of thermoplastic material in the passageway 76 for engagement by the drive member 84 and for providing friction to help retain the elongate piece 64 in the passageway 76 before it is engaged by the drive means.

The walls 74 that define the passageway 76 for receiving the elongate piece 64 in a position aligned with the through opening in the sleeve 20a each have generally arcuate opposed portions 88 (FIG. 3) relieved along their inner surfaces to receive the gripping parts 30a and the surrounding supporting structure of the frame 12a, and having through slots 90 (FIG. 2) at their ends adjacent the sleeve 20a that receive normally horizontal reinforcing webs on the frame 12a. The walls also include transverse end wall portions 92 (FIG. 2) at their ends opposite the sleeve 20a that interlock at their bottom edge, and longitudinally extending opposed contacting to wall portions 94 that are held together by a U-shaped spring metal channel 96 that fits around the top wall 94 portions to hold the walls 74 in place around the gripping parts 30a and adjacent portions of the frame 12a. The arcuate portions 88 of the walls 74 have inner surfaces that, with the inner surfaces of the gripping parts 30a, define the passageway 76 that has an inlet through the end wall portions 92.

The walls 74 also include opposed longitudinally extending spaced ledges 98 along their edges opposite the top wall portions 94, and the slide 78 has opposite longitudinally extending grooves to receive the ledges 98 to afford reciprocation of the slide 78 along the ledges 98 between its retracted and advanced positions.

The drive member 84 is elongate, has a plurality of or three teeth 102 adapted to engage between the cylindrical portions 66 of the elongate piece 64 projecting from one side adjacent a first end, and is positioned in a groove in the slide 78 extending axially of the passageway 76 with its longitudinal direction generally parallel to the passageway 76 and the teeth 102 adjacent the sleeve 20a. The drive member 84 has its second end opposite its first end mounted on the slide 78 by a pivot pin 100 extending transverse to the passageway 76 for pivotal movement between (1) an engage position (FIG. 4) with the teeth 102 in engagement between the cylindrical portions 66 of an elongate piece 64 positioned in the passageway 76 (to which engage position the drive member 84 is biased by a coil spring 104 between projections 106 and 107 projecting respectively from the sides of the drive member 84 and slide 78 opposite the passageway 76); and (2) a release position (FIG. 5) with the teeth 102 spaced from the elongate piece 64 in the passageway 76 (toward which release position the drive member 84 can be pivoted by camming movement of the inclined rear surface of the teeth 102 over the cylindrical portions 66 of the elongate piece 64 and/or engagement of an operator's thumb with the projection 106 to move the slide 78 toward its retracted position).

Additionally means are provided for restricting pivotal movement of the drive member 84 from its engage to its release position when an operator applies force to the slide 78 to move it towards its advanced position. The opening through the drive member 84 in which the pivot pin 100 is received is elongate in a direction parallel to the passageway 76 so that, in its engage position, the drive member 84 can move axially of the passageway 76 and longitudinally with respect to the slide 78 on which it is mounted between (1) a normal position to which it is biased by the spring 104 and from which it can be pivoted to its release position due to separation between a lock pin 108 through the drive member 84 and the slide 78 (FIG. 5), and (2) a locked position (FIG. 4) with the lock pin 108 engaged in a transverse groove along a forward facing surface on the slide 78, to which locked position the drive member 84 will be moved against the bias of the spring 104 by a force transferred from the slide 78 to the drive member 84 to press the block 64 into the sleeve 20a.

The sprocket wheel 86, which provides means for aligning the elongate piece 64 of thermoplastic in the passageway 76 for engagement by the teeth 102 of the drive member 84 and for providing sufficient friction to retain the elongate piece 64 in the passageway 76 before it is engaged by the drive member 84, is rotatably mounted on a pin 110 extending transverse of the passageway 76 on the side of the passageway opposite the drive member 84 and adjacent the inlet of the passageway 76. The sprocket has a plurality of teeth with axially extending parallel tips spaced to engage between the projecting parts of the cylindrical portions 66 and engage the corresponding planar surfaces of the rectangular portions 68 therebetween to orient those contacted planar surfaces parallel to the teeth and axis of the sprocket 86, and to thereby orient the opposite corresponding planar surfaces of the rectangular portions 68 parallel to the teeth 102 on the drive member 84.

To use the dispensing device 60, an operator first connects its power cord 47a to a source of electrical power so that its barrel member 14a and barrier ring are heated by its heating element. After insuring the slide 78 is in its retracted position, the operator inserts one end of the elongate piece 64 of thermoplastic material into the open inlet end of the feeding assembly 62 which orients the elongate piece 64 in the passageway 76 by engagement of the teeth on the sprocket wheel 86 along corresponding sides of its rectangular portions 68. He then grabs the handle 26a with one hand, engages the thumb of that hand in the recess 82 in the slide 78 and uses his thumb to move the slide 78 so that the teeth 102 on the drive assembly engage between the cylindrical portions 66 on the elongate piece 64 to press the elongate piece 64 toward the sleeve 20a and into the melting chamber in the barrel member 14a where the end portion of the elongate piece 64 will be made molten by contact with the inner surface of the barrel member 14a. As the slide 78 is thus moved from its retracted position toward its advanced position, the force applied through the drive member 84 will allow the drive member 84 to slide longitudinally against the bias of the spring 104, causing the lock pin 108 to engage the transverse slot in the leading surface of the slide 78 and thereby preventing the drive member 84 from moving toward its release position.

After the slide 78 is thus moved fully to its advanced position, the operator can manually retract the slide 78 along the periphery of the block 64 by engagement of his thumb against the projection 106 on the drive member 84 which projects into the recess 82 in the slide 78, which engagement will cause the drive member 84 to move relative to the slide 78, the lock pin 108 to move out of the groove in the slide 78, and the drive member 84 to pivot so that the teeth 102 move out of engagement with and along the periphery of the elongate piece 64 in the passageway 76; whereupon the operator can again manipulate the slide 78 with his thumb to engage the teeth 102 with a new portion of the elongate piece 64 and continue pressing it into the sleeve 20a and the melting chamber. Preferably the teeth 102 have leading edges that are disposed at about 89 degrees with respect to the longitudinal direction of the drive member 84 to help the teeth 102 release from the block 64.

Referring now to FIG. 6 there is shown a second embodiment of a block or elongate piece of solid thermoplastic material according to the present invention generally designated by the reference numeral 194. The elongate piece 194 comprises a plurality of coaxial generally cylindrical portions 196 with uniform predetermined axial and diametrical dimensions (e.g., about 0.38 centimeter and 1.5 centimeter respectively), which generally cylindrical portions 196 are uniformly axially spaced along the block 194 by portions 197 and 198 having rectangular cross sections having uniform diagonal dimensions about equal to the diametrical dimensions of the cylindrical portions 196, having corners aligned with the peripheries of the cylindrical portion 196 and having axial dimensions that are shorter than but generally similar to the axial dimensions of the cylindrical portion 196 (e.g., about 0.25 centimeter). These alternating cylindrical portions 196 and rectangular portions 197 and 198 result in an elongate piece 194 with evenly spaced projecting arcuate parts of the cylindrical portions 196 projecting from each of four sides of the elongate piece 194 defined by the aligned peripheral surfaces of the rectangular portions 198. These projecting arcuate parts provide uniformly spaced opposed arcuate teeth along opposite sides of the elongate piece 194 with planar surface portions of the elongate piece 194 between roots of adjacent teeth, and these teeth or projecting parts of the cylindrical portion 196 are like teeth on a rack and allow the elongate piece 194 to be aligned and driven by the feeding assembly 62 in the dispensing device 60 described above, while the spaces between these projecting parts of the cylindrical portions 196 also provide receptacles for molten material to facilitate melting the block 194 within the device 60 as has previously been described. The portions 197 are square in cross section and are disposed between a plurality of (illustrated as 6) adjacent cylindrical portions 196 to provide relatively stiff portions of the elongate piece 194, with the elongate rectangular portions 198 providing a high degree of flexibility for the elongate piece 194 between those relatively stiff portions which allows it to be coiled for storage as has previously been explained.

Figure 7:
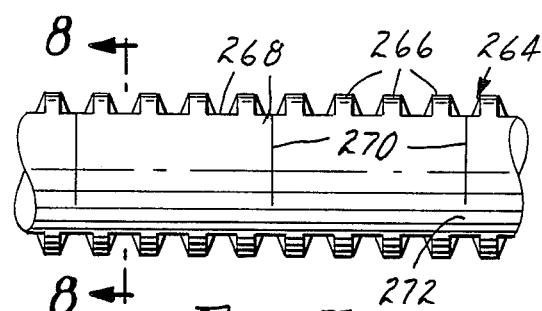
FIG. 7 is a side elevational view of a third embodiment of an elongate piece of solid thermoplastic material having a shape according to the present invention.
Figure 8:
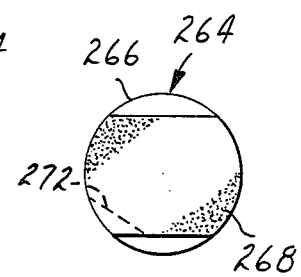
FIG. 8 is a sectional view taken approximately along line 8—8 of FIG. 7.

Referring now to FIGS. 7 and 8 there is shown a third embodiment of a block or elongate piece of solid thermoplastic material according to the present invention generally designated by the reference numeral 264. The elongate piece 264 comprises a plurality of coaxial generally cylindrical portions 266 with uniform predetermined axial and diametrical dimensions (e.g., about 0.38 centimeter and 1.5 centimeter respectively), which generally cylindrical portions 266 are uniformly axially spaced along the block 264 by similarly sized and oriented spacing portions 268 having cross sections that are flat on two opposite sides and arcuate on two opposite sides having diagonal dimensions between its arcuate sides equal to the diametrical dimensions of the cylindrical portions 266, and having axial dimensions that are shorter than but generally similar to the dimensions of the cylindrical portions 266 (e.g., about 0.25 centimeter). These alternating cylindrical and spacing portions 266 and 268 result in an elongate piece 264 with evenly spaced projecting arcuate parts of the cylindrical portions 266 projecting from only two opposite sides of the elongate piece 264 defined by the aligned flat peripheral surfaces of the spacing portions 268. These projecting arcuate parts provide uniformly spaced opposed arcuate teeth along opposite sides of the elongate piece 264 with planar surface portions of the elongate piece 264 between roots of adjacent teeth, and these teeth or projecting parts of the cylindrical portion 266 are like teeth on a rack and allow the elongate piece 264 to be aligned and driven by the feeding assembly 62 in the dispensing device 60 described above, while the spaces between these projecting parts of the cylindrical portions 66 also provide receptacles for molten material to help facilitate melting the elongate piece 268 within the device 60 as has previously been described. The elongate piece 268 may also have a plurality of spaced cuts 270 extending almost entirely through certain of its spacing portions 268 while retaining generally triangular hinge-like portions 272 at corners of those rectangular portions 268 that afford ease of bending the elongate piece 268 so that it may be easily coiled for shipment or storage.

Figure 9:
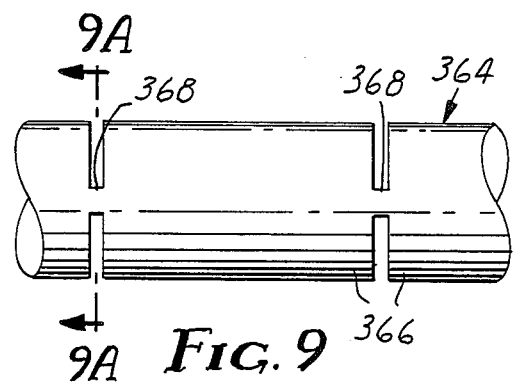
FIG. 9 is a side elevational view of yet a forth embodiment of an elongate piece of solid thermoplastic material having a shape according to the present invention.
Figure 9A:
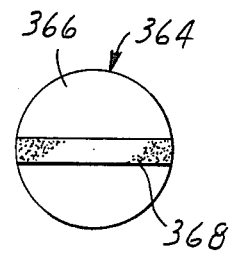
FIG. 9A is a sectional view taken approximately along line 9A—9A of FIG. 9.

Referring now to FIGS. 9 and 9A there is shown a forth embodiment of a block or elongate piece of solid thermoplastic material according to the present invention generally designated by the reference numeral 364. The elongate piece 364 comprises a plurality of coaxial generally cylindrical portions 366 with uniform predetermined axial and diametrical dimensions (e.g., about 2.5 centimeters and 1.5 centimeters respectively), which generally cylindrical portions 366 are uniformly axially spaced along the elongate piece 364 by similarly sized and oriented portions 368 having rectangular cross sections having uniform diagonal dimensions about equal to the diametrical dimensions of the cylindrical portions 366, having corners aligned with the peripheries of the cylindrical portion 366 and having axial dimensions that are substantially less than those of the cylindrical portion 366 (e.g., about 0.25 centimeter). These alternating cylindrical and rectangular portions 366 and 368 result in an elongate piece 364 with evenly spaced projecting arcuate parts of the cylindrical portions 366 projecting from opposite sides of the elongate piece 364 defined by the aligned peripheral surfaces of the rectangular portions 368. These projecting arcuate parts provide uniformly spaced opposed arcuate teeth along opposite sides of the elongate piece 364 with planar surface portions of the elongate piece 364 between roots of adjacent teeth, and these teeth or projecting parts of the cylindrical portions 366 are like teeth on a rack and allow the elongate piece 364 to be aligned and driven by a feeding assembly (not shown) which would be similar to the device 60, but with only one tooth 102 on the drive member 84. The spaces between these projecting parts of the cylindrical portions 366 also provide a high degree of flexibility for the elongate piece 364 which allows it to be coiled for storage as has previously been described.

Referring now to FIGS. 10 and 10A there is shown a fifth embodiment of a block or elongate piece of solid thermoplastic material according to the present invention generally designated by the reference numeral 464. The elongate piece 464 comprises a plurality of cylindrical parts 466 with uniform predetermined axial and diametrical dimensions (e.g., about 2.5 centimeters and 1.5 centimeters respectively), which generally cylindrical parts 466 are separated by at least one, and as illustrated a plurality of cuts 468 extending almost entirely through the elongate piece 464 while retaining arcuate hinge-like portions 470 between the parts 466 of the elongate piece 464 on opposite sides of the cuts 468 that afford bending of the elongate piece at the hinge-like portions 470 in one direction to allow easy coiling of the elongate piece 464 for shipment and storage. The elongate piece 464 is usable in dispensing devices of types different from the device 10 illustrated herein which are adapted to engage the peripheries of solid cylindrical pieces of thermoplastic material to drive them through the device. Like the other elongate pieces of thermoplastic material 64, 194, 264 and 364 described herein, the elongate piece 464 may be very much longer than illustrated and can be conveniently stored and shipped in a coil.

Referring now to FIGS. 11 through 19 there is illustrated a method and molding and cutting mechanisms or devices 120 and 160 according to the present invention for making the elongate piece 64 of thermoplastic material shown in FIG. 1.

As illustrated in FIGS. 11 through 16, the molding mechanism 120 comprises first and second chain-like structures 122 and 123, each comprising a plurality of block shaped mold parts 124. Each of the mold parts 124 (FIGS. 14 and 15) has parallel end surfaces 125, a side surface or face 126 disposed at a right angle with respect to its end surfaces 125, and an elongate centrally located cavity 128 opening through its face 126 and end surfaces 125. The cavity 128 has the shape of one half of the elongate piece 64 divided along a plane through its axis and two opposite corners of each of its rectangular portions 68. The mold parts 124 in the first chain-like structure 122 are attached together close to their end surfaces 125 by flanking circular pivot plates 130 pivotably connected to the mold parts 124 by shoulder bolts 131; and the mold parts 124 in the second chain-like structures 123 are attached together close to their end surfaces 125 by flanking semicircular pivot plates 132 pivotably connected to the molds 124 by shoulder bolts 133. The pivot plates 132 have semicircular recesses 134 in their sides adjacent the faces 126 of the mold parts 124 which will receive portions of the circular pivot plates 130 and allow adjacent mold parts 124 between the chain-like structures 122 and 123 to be longitudinally registered in face 126 to face 126 contact with the mold cavities 128 aligned between the faces 126 of the mold parts 124 and with the end surfaces 125 of adjacent mold parts 124 along each of the chain-like structures 122 and 123 in contact with the ends of the cavities 125 opening through the end surfaces 125 aligned between adjacent mold parts 124.

Figure 12:
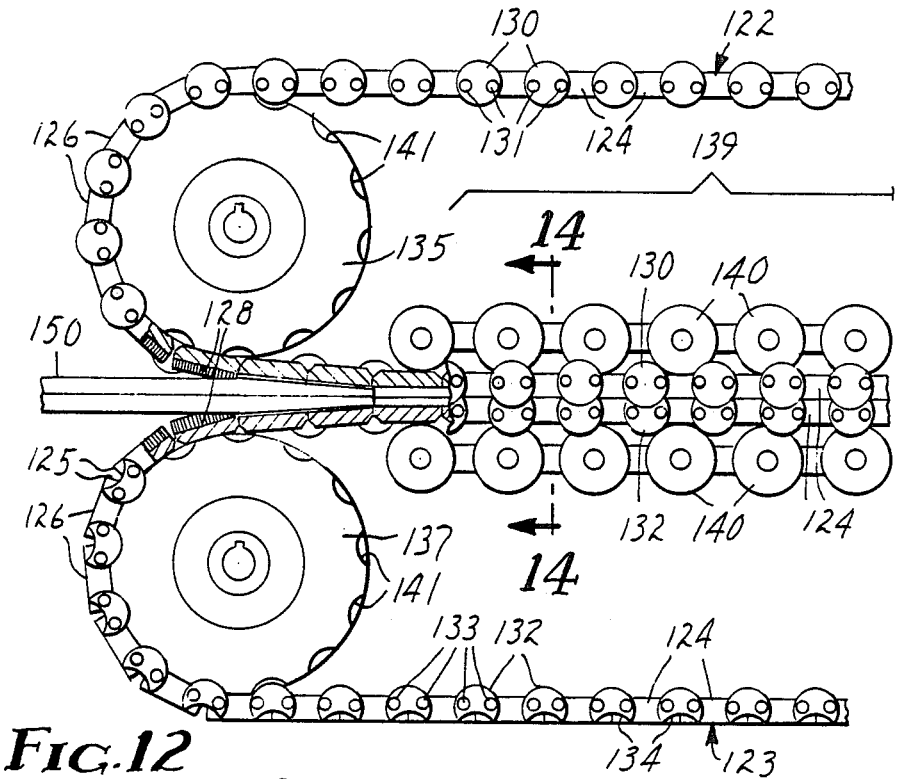
FIGS. 12 and 13 are enlarged fragmentary views of inlet and outlet ends respectively of the mechanism shown in FIG. 11, which mechanism has parts broken away and removed to show details.
Figure 13:
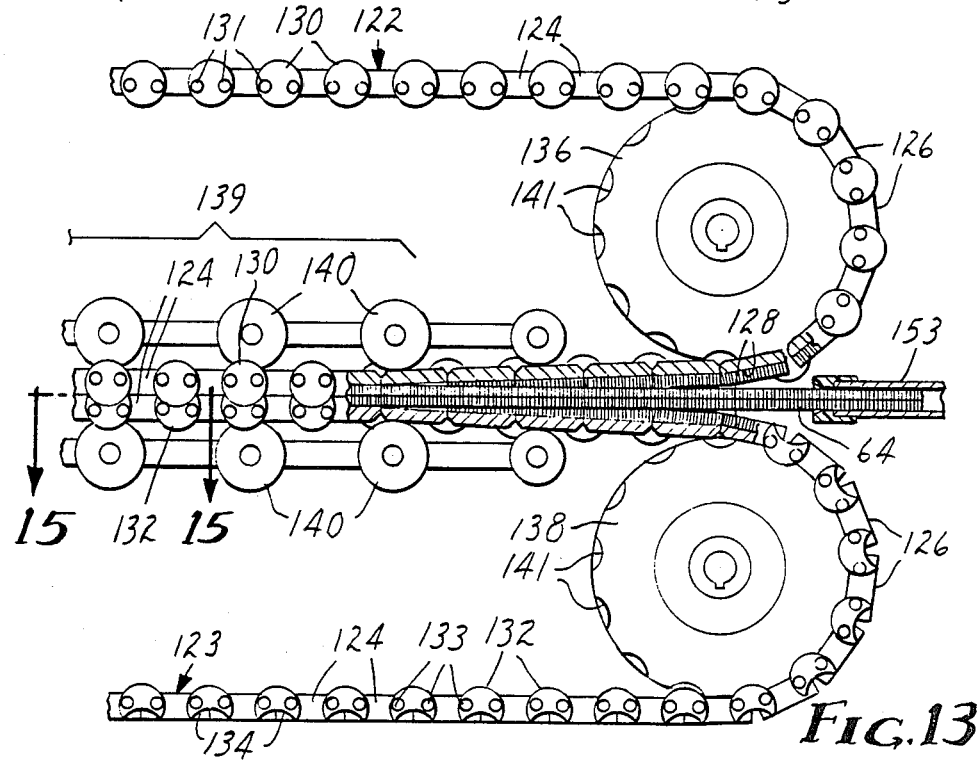
Figure 14:
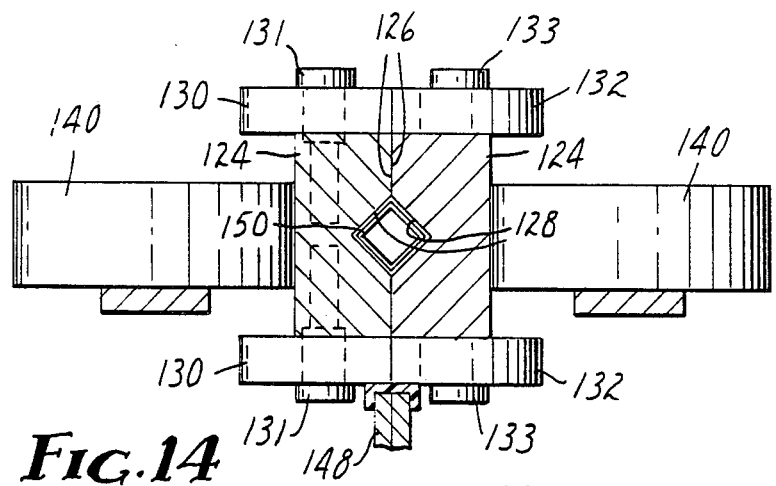
FIG. 14 is an enlarged fragmentary section view taken approximately along line 14—14 of FIG. 12.
Figure 15:
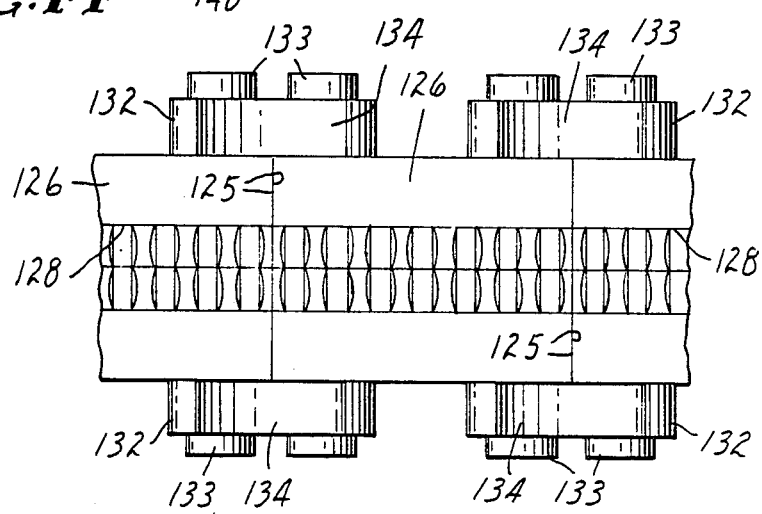
FIG. 15 is an enlarged fragmentary sectional view taken approximately along line 15—15 of FIG. 13.
Figure 16:
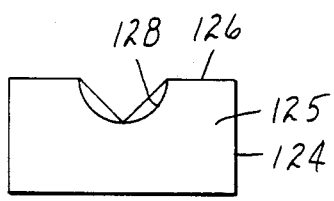
FIG. 16 is an end detail view of one of a plurality of mold parts included in the mechanism shown in FIGS. 11 through 15.

The two chain-like structures 122 and 123 are disposed around and extend between pairs of sprockets 135, 136 and 137, 138 respectively each rotatable about a vertical axis, with each pair of sprockets 135, 136 and 137, 138 spaced and positioned to allow adjacent lengths of the chain-like structures 122 and 123 to move along a linear path portion 139 with the mold parts 124 in face 126 to face 126 contact and slidably supported along their lower surfaces by a support 148 (FIG. 13). Along that linear path portion 139 the mold parts 124 will be maintained in face 126 to face 126 contact by two rows of rollers 140 that are spaced to engage the surfaces of the mold parts 124 opposite their faces 126. The sprockets 135, 136, 137, and 138 have semicircular notches 141 shaped to closely receive circular portions of the pivot plates 130 or 132 to both help keep the chain-like structures 122 and 123 in synchronism, and to drive the chain-like structures 122 and 123 via a roller chain 142, sprockets 143, 144, 145 and 146 and a gear reduced variable speed drive unit 147 as is shown in FIG. 11. The sprockets 135 and 137 are spaced apart and spaced from the inlet end of the linear path portion 139 defined by the rollers 140 (FIGS. 11 and 12) so that the faces 126 of the mold parts 124 are spaced apart at the nip of the sprockets 135 and 137 (e.g., about 2.5 centimeter) and the mold parts 124 move along generally parallel but converging path portions for a short distance (e.g., about 18 centimeters) between the peripheries of the sprockets 135 and 137 and the linear path portion 139; and the sprockets 136 and 138 are spaced apart and spaced from the outlet end of the linear path portion 139 so that the mold parts 124 move along a generally parallel but diverging path portion for a short distance (e.g., about 30 centimeters) from that outlet to the peripheries of the sprockets 136 and 138 (FIG. 13) where the faces 126 of the mold parts 124 are spaced apart (e.g., 3.8 centimeter). This allows the pivot plates 130 and 132 to move in proper alignment for engagement or disengagement of the circular plates 130 with the recesses 134 in the plates 132 in directions generally normal to the faces 126 of the mold parts 124 before or after the plates 130 and 132 engage along the linear path portion 139 as a result of contact by the rollers 140, which engagement or disengagement could not so easily occur if the mold parts 124 moved into and out of face 126 to face 126 contact at the peripheries of the sprockets 135, 137; 136, 38; and allows the mold parts 124 to separate sufficiently in a direction generally normal to the faces 126 to disengage the projecting parts of the cylindrical portions 66 of a newly formed continuous length 149 of thermoplastic material from the cavities 128 in the mold parts 124 before the mold parts 124 start to move away from each other around the sprockets 136 and 138.

Molten polymeric material is delivered through an elongate tube 150 from a source such as an extruder (not shown) into the cavity between the face 126 to face 126 mold parts 124 at a beginning of the linear path portion 139, which tube 150 has a square periphery sized and oriented to just fit inside the cavity between the portions of the mold parts 124 that form the portions 68 with square cross square cross sections for the elongate piece 64 of thermoplastic material (FIG. 12). The molten material cools and solidifies as the mold parts 124 move along the linear path portion 139, and the continuously molded continuous length 149 of thermoplastic material is stripped from between the mold parts 124 as they separate at an end of the linear path portion 139 by means comprising a guide tube 153 and is propelled through the guide tube 153 into the cutting mechanism 160 shown in FIGS. 17 through 19 for cutting the continuous length 149 of thermoplastic material into elongate pieces 64 of predetermined lengths, and forming the spaced cuts 70 along the elongate pieces 64.

Referring now to FIGS. 17 through 19 there is illustrated a method and the mechanism 160 according to the present invention for cutting the continuously length 149 of thermoplastic material molded by the molding mechanism 120 into elongate pieces 64 of predetermined lengths, and for forming the spaced cuts 70 along the elongate pieces 64.

As illustrated, the cutting mechanism 160 comprises first and second chain-like structures 162 and 163, each comprising a plurality of block shaped support members 164. Each of the support members 164 has end surfaces 165, a side surface or face 166 between its end surfaces 165, and an elongate centrally located semicylindrical recess 167 opening through its faces 166 and end surfaces 165 adapted to receive one half of the continuous length 149 of thermoplastic material molded by the molding mechanism 120. The support members 164 in the first chain-like structure 162 are attached together adjacent their end surfaces 165 by flanking circular pivot plates 170 pivotably connected to the support members 164 by shoulder bolts 171, and the support members 164 in the second chain-like structure 163, are attached together adjacent their end surfaces 165 by flanking semicircular pivot plates 172 pivotably connected to the support members 164 by shoulder bolts 173. The pivot plates 172 have semicircular recesses 174 in their sides adjacent the faces 166 of the support members 164 which will receive portions of the circular pivot plates 170 and allow adjacent support members 164 between the chain-like structures 162 and 163 to be longitudinally registered in faces 166 to face 166 contact with the recesses 167 aligned between the support members 164.

The two chain-like structures 162 and 163 are disposed around and extend between pairs of sprockets 175, 176 and 177, 178 respectively, with each pair of sprockets 175, 176, and 177, 178 spaced and positioned to allow adjacent lengths of the chain-like structures 162 and 163 between the pairs of sprockets 175, 176 and 177, 178 to move in face 166 to face 166 contact. The sprockets 175, 176, 177, and 178 have semicircular notches 180 shaped to closely receive circular portions of the pivot plates 170 or 172 to both help keep the chain-like structures 162 and 163 in synchronism, and to drive the chain-like structures 162 and 163 so that rotation of two of the sprockets 175, 177 or 176, 178 by a drive connection (not shown) powered by the drive unit 147 can drive the chain-like structures 162 and 163 in synchronism with the chain-like structures 122 and 123 of the molding mechanism 120. Thus the pair of sprockets 175, 176 and 177, 178 provide means for moving each of the chain-like structures 162 and 163 around a separate path with portions of the chain-like structures 162 and 163 moving in face 166 to face 166 relationship along a linear cutting path portion from a beginning of the cutting path portion between the sprockets 175 and 177 positioned to receive the continuous length 149 of thermoplastic material from the molding mechanism 120 to an end of the linear cutting path portion between the sprockets 176 and 178 where the separate elongate pieces 64 are expelled.

A plurality of knives 181 and 182 are mounted on the support members 164 of the first chain-like member 162 between edge guides 183 fixed to those support members for movement in a direction transverse to the recess 174 between retracted positions spaced from the recess 174 and severed portions at which the knives 182 extend across the recess 174 in the support members 164 along the cutting path portion, and the knives 181 (which are shorter than the knives 182) extend only partially across the recess 174 in the support members 164 along the cutting path portion.

Means are provided for moving the knives 182 from their retracted positions to their severed positions along the cutting path portion to cut the continuous length 149 of thermoplastic material from the molding mechanism 120 into elongate pieces 64 of predetermined lengths and form the cuts 70 along those elongate pieces 64, and for returning the knives 181 and 182 to their retracted positions along a portion of the path spaced from said cutting path portion. The support members 164 on the second chain-like structure 163 are supported on their sides opposite their recess 174 by a plurality of rollers 185 rotatably mounted on a frame member 186. A circular cam 188 is mounted for rotation about an axis parallel to and spaced from its axis and is driven by means (not shown) in an eccentric path so that it will engage and press each-knife 182 from its retracted to its severed position as the knife 182 moves past the cam 188 along the cutting portion of the path. Such movement will either form one of the cuts 70 or sever an elongate piece 64 from the continuous length 149 of thermoplastic material which elongate piece 64 will be expelled from between the chain-like structures 162 and 163 as they separate around the sprockets 176 and 178, and movement of the support members 64 carrying the knives 182 around the sprocket 176 will cause the knives 182 to return to their retracted positions under the influence of gravity as those support members 164 move along the portion of the path for the first chain-like structure 162 spaced from the cutting path portion. Knives 181 and 182 may be added or removed from certain of the support members 164 as desired to provide elongate pieces 64 of different predetermined lengths having cuts 70 spaced at different locations along their lengths.

The present inventions have now been described with reference to single embodiments thereof. It will be apparent to those skilled in the art that many changes can be made in the embodiments described without departing from the scope of the present inventions. Thus the scope of the present invention should not be limited to the structures described in this application, but only by structures described by the language of the claims and their equivalents.

I claim:

1. An elongate piece of solid thermoplastic material comprising coaxial generally cylindrical portions with uniform predetermined axial and diametrical dimensions uniformly axially spaced along the piece by generally rectangular portions having diagonal dimensions generally similar to said diametrical dimension to define arcuate tooth like portions of said cylindrical portions for engagement by the feeding mechanism of a device adapted to receive, melt and dispense the thermoplastic material.

2. An elongate piece of solid thermoplastic material according to claim 1 having at least one cut extending almost entirely transversely through the elongate piece while retaining a hinge-like portion between parts of the elongate piece on opposite sides of the cut that affords bending of the elongate piece at the hinge-like portion.

3. An elongate piece of solid thermoplastic material according to claim 2 having a plurality of said cuts spaced along its length.

4. An elongate piece of solid thermoplastic material according to claim 1 wherein said generally rectangular portions are square in cross section, and have lengths axially along said elongate piece generally similar to the axial lengths of said cylindrical portions.

5. An elongate piece of solid thermoplastic material according to claim 4 having at least one cut extending almost entirely transversely through the elongate piece while retaining a hinge-like portion between parts of the elongate piece on opposite sides of the cut that affords bending of the elongate piece at the hinge-like portion.

6. An elongate piece of solid thermoplastic material according to claim 5 having a plurality of said cuts spaced along its length.

7. An elongate piece of solid thermoplastic material according to claim 1 wherein said rectangular portions have lengths axially along said elongate piece generally similar to the axial lengths of said cylindrical portions; some of said rectangular portions are square in cross section and other of said rectangular portions are elongate in cross section and provide hinge like portions that afford ease of bending of said elongate piece.

8. An elongate piece of solid thermoplastic material according to claim 1 wherein said cylindrical portions have axial lengths substantially larger than the lengths of said rectangular portions along said elongate piece, and said rectangular portions are elongate in cross section and provide hinge like portions that afford ease of bending of said elongate piece and spacing of said cylindrical portions to afford driving engagement therewith.

9. A generally cylindrical elongate piece of solid thermoplastic material comprising uniformly spaced arcuate teeth along opposite sides with parallel planar piece surface portions generally parallel to the axis of said elongate piece between the roots of adjacent teeth to afford engagement with the teeth by the feeding mechanism of a device adapted to receive, melt and dispense the thermoplastic material.

10. An elongate piece of solid thermoplastic material according to claim 9 having at least one cut extending almost entirely transversely through the elongate piece while retaining a hinge-like portion between parts of the elongate piece on opposite sides of the cut that affords bending of the elongate piece at the hinge-like portion.

11. An elongate piece of solid thermoplastic material according to claim 10 having a plurality of said cuts spaced along its length.

12. An elongate piece of solid thermoplastic material having at least one cut extending almost entirely transversely through the elongate piece while retaining a hinge-like portion between parts of the elongate piece on opposite sides of the cut that affords bending of the elongate piece in one direction at the hinge-like portion.

13. An elongate piece of solid thermoplastic material according to claim 12 having a plurality of said cuts spaced along its length.

14. An elongate piece of solid thermoplastic material according to claim 12 comprising coaxial generally cylindrical portions with uniform predetermined axial and diametrical dimensions uniformly axially spaced along the piece by generally rectangular portions having diagonal dimensions generally similar to said diametrical dimension.

15. An elongate piece of solid thermoplastic material according to claim 14 wherein said generally rectangular portions are square in cross section, and have lengths axially along said elongate piece generally similar to the axial lengths of said cylindrical portions.

16. A generally cylindrical elongate piece of solid thermoplastic material according to claim 12 comprising uniformly spaced arcuate teeth along opposite sides.

* * * * *